United States Patent [19]
Herley

[11] Patent Number: 5,838,818
[45] Date of Patent: Nov. 17, 1998

[54] ARTIFACT REDUCTION COMPRESSION METHOD AND APPARATUS FOR MOSAICED IMAGES

[75] Inventor: Cormac Herley, Los Gatos, Calif.

[73] Assignee: Hewlett-Packard Company, Palo Alto, Calif.

[21] Appl. No.: 878,170

[22] Filed: Jun. 18, 1997

[51] Int. Cl.$^6$ ................................ G06K 9/00; G06K 9/36
[52] U.S. Cl. ............................................ 382/166; 382/232
[58] Field of Search .................................. 382/166, 232, 382/233, 239, 248

[56] References Cited

U.S. PATENT DOCUMENTS

| | | | |
|---|---|---|---|
| 5,287,420 | 2/1994 | Barrett | 382/235 |
| 5,627,916 | 5/1997 | Horiuchi | 382/166 |

*Primary Examiner*—Phuoc Tran

[57] ABSTRACT

A process and apparatus is described to improve the fidelity of compressed demosaiced images by decreasing the error introduced for a given compression ratio. Because (typically) two out of three of the color values at any location of the demosaiced image are interpolated, most of the loss can be concentrated into these values, so that the actual or measured data values have little loss. This is achieved by finding an interpolation of the data such that the original measured values suffer minimal loss in the lossy compression, while the loss for the other interpolated values may be arbitrarily large. Thus, rather than performing an interpolation first and accepting whatever loss the compression scheme (e.g., JPEG) gives, the values to be interpolated are treated as "Don't cares" and then provided so as to minimize the loss for the measured values. The algorithms presented require no additional memory and entail a reasonable increase in run-time.

18 Claims, 7 Drawing Sheets

*Figure 1*

| GREEN 200 | RED 201 | GREEN 202 | RED 203 |
|---|---|---|---|
| BLUE 210 | GREEN 211 | BLUE 212 | GREEN 213 |
| GREEN 220 | RED 221 | GREEN 222 | RED 223 |
| BLUE 230 | GREEN 231 | BLUE 232 | GREEN 233 |

*Figure 2*

| RED 300 | BLUE 301 | RED 302 | BLUE 303 |
|---|---|---|---|
| GREEN 310 | RED 311 | GREEN 312 | RED 313 |
| RED 320 | BLUE 321 | RED 322 | BLUE 323 |
| GREEN 330 | RED 331 | GREEN 332 | RED 333 |

*Figure 3*

| BLUE 400 | GREEN 401 | BLUE 402 | GREEN 403 |
|---|---|---|---|
| RED 410 | BLUE 411 | RED 412 | BLUE 413 |
| BLUE 420 | GREEN 421 | BLUE 422 | GREEN 423 |
| RED 430 | BLUE 431 | RED 432 | BLUE 433 |

ARTIFACT REDUCTION COMPRESSION METHOD AND APPARATUS FOR MOSAICED IMAGES

BACKGROUND OF THE INVENTION

1. Field of the Invention

The present invention relates to digital image processing and, more particularly, to compressing mosaiced images.

2. Description of the Related Art

Color digital images acquired by a digital camera are typically mosaiced. For storage of the image on the camera, one can either store the raw data values, compress the data to store using some lossless compression technique, or compress the data to store using a lossy scheme such as JPEG (Joint Photographic Experts Group). See, for example, the baseline version of the JPEG algorithm (ITU-T Rec.T.81/ISO/IEC 10918-1 "Digital Compression and Coding of Digital Still Images"). Storing raw data or data compressed using a lossless compression scheme requires more memory for image storage than is required by using a lossy compression scheme. To get the maximum benefit from the JPEG algorithm, however, it is first usual to transform to a luminance/chrominance space such as YUV or YCrCb. To carry out this transformation it is first necessary to demosaic the image to have a full 24-bit image. There are a variety of algorithms that carry out this color interpolation.

Having been demosaiced, the 24-bit image is color transformed and JPEG compressed, which of course involves some loss. The loss however is spread throughout all of the colors at all of the locations and introduces undesirable artifacts into the decompressed image.

Thus, it can be seen that lossy image compression techniques impose image fidelity limits upon mosaiced image devices, and hinder the use of these devices in many applications.

Therefore, there is an unresolved need for a lossy image compression technique that can improve the fidelity of compressed demosaiced images by decreasing the error introduced for a given compression ratio.

SUMMARY OF THE INVENTION

A process and apparatus is described to improve the fidelity of compressed demosaiced images by decreasing the error introduced for a given compression ratio. Because (typically) two out of three of the color values at any location of the demosaiced image are interpolated, most of the loss can be concentrated into these values, so that the actual or measured data values have little loss. This is achieved by finding an interpolation of the data such that the original measured values suffer minimal loss in the lossy compression, while the loss for the other interpolated values may be arbitrarily large. Thus, rather than performing an interpolation first and accepting whatever loss the compression scheme (e.g., JPEG) gives, the values to be interpolated are treated as "Don't cares" and then provided so as to minimize the loss for the measured values.

For one embodiment of the color interpolation process, the raw data is the plane R. We add the two interpolated planes $I_0$ and $I_1$ to form a 24-bit image. After compression and decompression these planes become respectively R', $I_0$', $I_1$'. After compression the error is (R-R', $I_0$-$I_0$',$I_1$-$I_1$'). The first component, R-R', is iteratively forced to be small because this represents the error at the data locations. This is achieved by replacing R' with R then compressing and decompressing the resulting image. This process is repeated until R-R' is sufficiently small, or until a predetermined number of iterations have occurred.

The algorithms presented require no additional memory and entail a reasonable increase in run-time.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

Figure 1:
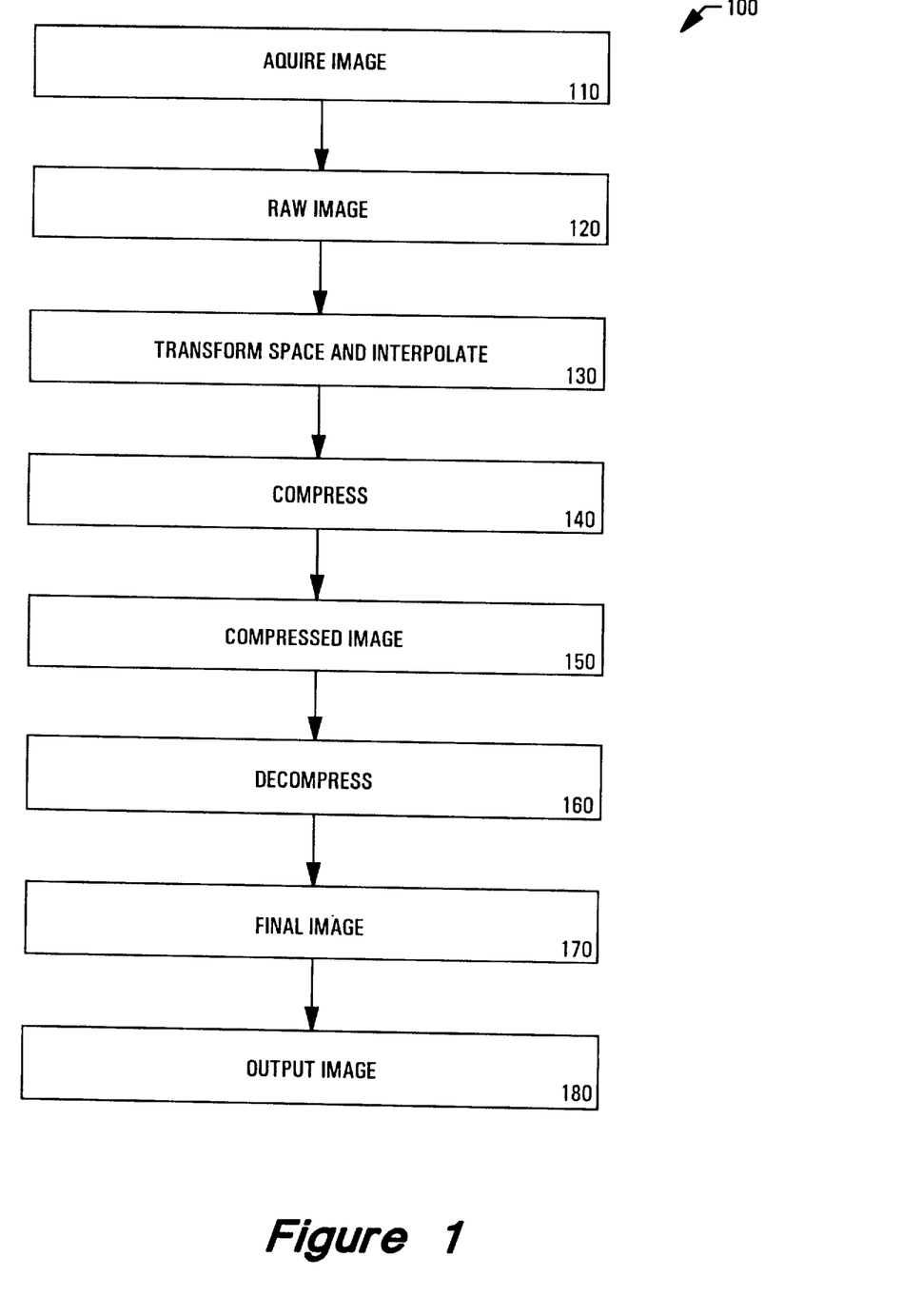
FIG. 1 is a block diagram illustrating an apparatus for processing a mosaiced digital image using a mosaiced image compression scheme that practices image compression artifact reduction according to the present invention.

FIG. 1 is a block diagram illustrating an apparatus 100 for processing a mosaiced digital image using a mosaiced image compression scheme that practices image compression artifact reduction according to the present invention. In FIG. 1, a raw digital color image 120 is acquired 110. Raw image 100 undergoes space transformation and interpolation 130 before being compressed 140, which yields compressed image 150. Final image 170 is decompressed 160 from compressed image 150 so that final image 170 can be output 180.

Although the following discussion will be made within the context of a digital camera, the image compression artifact reduction scheme can be practiced on any mosaiced digital image. For example, for alternate embodiments, image acquisition 110 can be performed by a facsimile or scanning apparatus. Similarly, output of final image 170 can be performed by any known image output device, (e.g., a printer or display device). Furthermore, although the following discussion will use a 24-bit digital color image as an example, it is to be understood that images having pixels with other color resolution may be used. Moreover, although the JPEG algorithm will be used in the example, it is to be understood that the image compression artifact reduction scheme can be practiced on any similar lossy compression.

As mentioned before, to get the maximum benefit from the JPEG algorithm, it is first necessary to transform to a luminance/chrominance space such as YUV or YCrCb. To carry out this transformation it is first necessary to demosaic the image to have a full 24-bit image. There are a variety of algorithms that carry out this color interpolation.

Having been demosaiced, the 24-bit image is color transformed and JPEG compressed, which of course involves some loss. The loss is typically spread throughout all of the colors at all of the locations and introduces undesirable artifacts into the decompressed image. However, as will be described below in greater detail, the compression technique of apparatus 100 has been modified to use a mosaiced image compression scheme that practices image compression artifact reduction according to the present invention.

Because two out of three of the color values at any location are interpolated, the image compression artifact reduction scheme of the present invention has been crafted to cause most of the loss to be concentrated in these values and to cause the actual or measured data values to have little loss. The aim of this scheme is to find an interpolation of the data such that the original measured values suffer minimal loss in the lossy JPEG compression, while the loss for the other interpolated values may be arbitrarily large. Thus, rather than performing an interpolation first and accepting whatever loss JPEG gives, the values to be interpolated are treated as "Don't cares" and interpolation is performed in whatever manner minimizes the loss for the measured values.

The Compression Block: JPEG

JPEG is a complex algorithm with many blocks, but for the purposes of this discussion we are only interested with the lossy (or non-invertible) portion of the algorithm. At the encoder this involves:

Transformation to the YcrCb (or similar space)
DCT (Discrete Cosine Transform) transformation
Quantization of DCT coefficients with a given Q-table and Q-factor At the decoder this involves:

Inverse quantization with a given Q-table and Q-factor.
Inverse DCT transformation
Inverse Color transformation to RGB.

The loss occurs in the quantization of the DCT coefficients. Each coefficient is quantized with a uniform quantizer the stepsize of which is determined by the appropriate entry in the predefined Q-table, and the Q-factor. Thus the quantized DCT coefficient is always an integer number of times the corresponding stepsize.

Observe that there would be no loss if all of the DCT coefficients happened to be equal to reconstruction levels of the quantizers. This is so because the quantizer represents ranges of possible coefficient values by a single reconstruction level. Observe that an image that has already been JPEG compressed identically has the property, that if it is compressed a second time (using the same quantization levels) the image will be unchanged.

The Color Interpolation Block

As we have said, the raw data consists of a mosaic of data samples from the three color planes. Before using an algorithm such as JPEG, we must interpolate to a 24-bit image. In other words, to the raw data image R shown in FIG. 2, we must add the two images $I_0$ and $I_1$ shown in FIGS. 3 and 4, respectively, to make the full color image. Obviously these last two images are calculated from the raw data R and contain no new measured data. We will refer to the full 24-bit image in terms of three planes, i.e. we shall denote the image (R, $I_0$, $I_1$).

Figure 2:
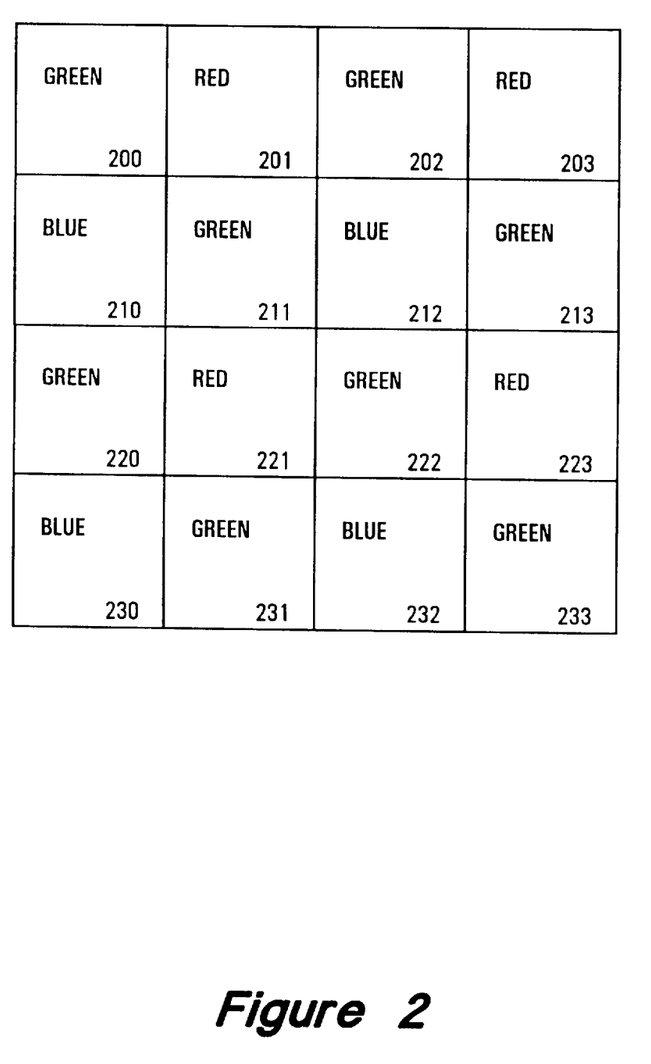
FIG. 2 is a diagram illustrating a raw data (R) mosaic suitable for applying mosaiced image compression artifact reduction according to the present invention.
Figure 3:
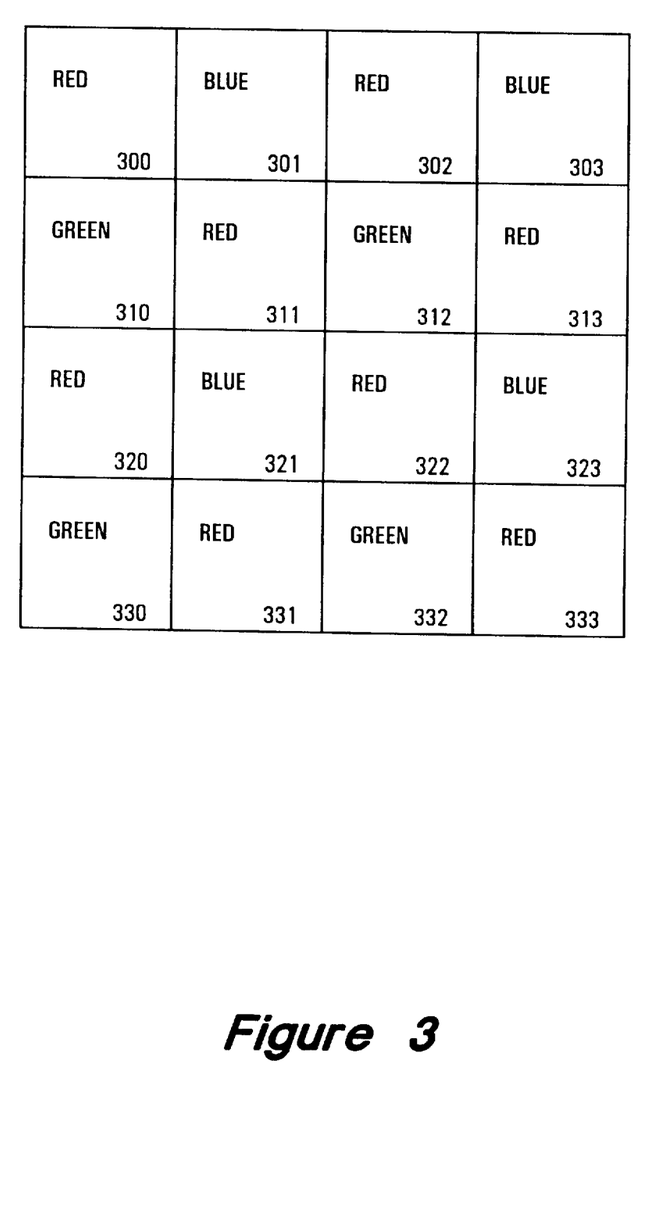
FIG. 3 is a diagram illustrating a first interpolated data ($I_0$) mosaic suitable for applying mosaiced image compression artifact reduction according to the present invention.
Figure 4:
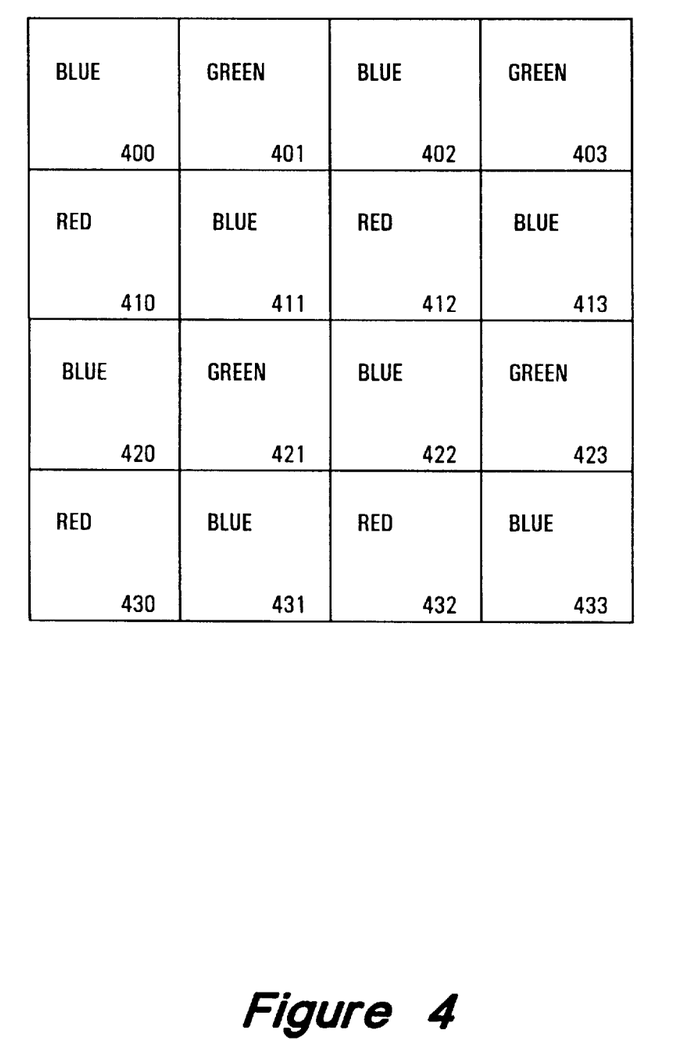
FIG. 4 is a diagram illustrating a second interpolated data ($I_1$) mosaic suitable for applying mosaiced image compression artifact reduction according to the present invention.

Thus, FIG. 2 is a diagram illustrating a raw data (R) mosaic suitable for applying mosaiced image compression artifact reduction according to the present invention. FIGS. 3 and 4 are corresponding diagrams that respectively illustrate first and second interpolated data ($I_0$ and $I_1$) mosaics suitable for applying mosaiced image compression artifact reduction according to the present invention. In FIG. 2, red sensors (201, 203, 221, 223), green sensors (200, 202, 211, 213, 220, 222, 231, 233) and blue sensors (210, 212, 230, 232) are arranged in a four-by-four mosaic. The values measured by the sensor of the mosaic are then interpolated to provide the missing values.

For example, according to one interpolation scheme, a red value for the location of green sensor 211 can be formed by averaging the red values measured by red sensors 201 and 221. This is shown as interpolated red value 311 of FIG. 3. Similarly, a blue value for the location of green sensor 211 can be formed by averaging the blue values measured by blue sensors 210 and 212. This is shown as interpolated blue value 411 of FIG. 4.

Therefore, in FIG. 3, red values (300, 302, 311, 313, 320, 322, 331, 333), green values (310, 312, 330, 332) and blue values (301, 303, 321, 322) are arranged in an interpolated four-by-four mosaic which corresponds to the four-by-four sensor mosaic of FIG. 2. Similarly, in FIG. 4, red values (410, 412, 430, 432), green values (401, 403, 421, 422) and blue values (400, 402, 411, 413, 420, 422, 431, 433) are arranged in an interpolated four-by-four mosaic which corresponds to the four-by-four sensor mosaic of FIG. 2.

Compression and Color Interpolation

Color interpolation algorithms are generally optimized for image quality, and good algorithms strive to minimize the effects of color aliasing and fringing. See, for example, Programmer's reference manual models: DCS200ci, DCS200mi, DCS200c, DCS200m, Eastman Kodak Company, December 1992.

However, the output of a good color interpolation algorithm may be hard to compress. Instead of using an algorithm tuned to producing good image quality, we color interpolate in a fashion that minimizes (or at least reduces) the error in the decoded image. Recall that the color interpolated image consists of a data plane R and two interpolated planes $I_0$ and $I_1$. The idea is that after decoding we need not care about the error in the decoded values of $I_0$ and $I_1$ so long as the error in the decoded value of R is small. We present next an algorithm to do just this. Note that this approach is in some sense complementary, but very different from the post-processing approach treated in co-pending patent application number 08/878,169, filed Jun. 18, 1997, entitled "Artifact Reduction Decompression Method and Apparatus for Interpolated Images", with inventor Cormac Herley.

Color Interpolation Algorithm to Minimize the Error at Mosaic Locations

We would like to color interpolate the image so that each DCT coefficient is close to being an integer times the stepsize for that coefficient. Thus we have two requirements of the 24-bit color image:

(1.) DCT coefficients of the image should equal quantizer reconstruction levels.

(2.) Image should equal the measured data at the mosaic locations.

In fact of course we can probably not satisfy both constraints, and will settle for approximately satisfying the first. It is not immediately apparent how this can be achieved, however.

First, suppose that we color interpolate, JPEG compress and decompress. Call this image $(R', I_0', I_1')$. The resulting image certainly satisfies the first property (recall all JPEG decompresed images have this property) but it no longer satisfies the second, (i.e. $R' \neq R$) because compression noise has been added. The error will be $$(R-R', I_0-I_0', I_1-I_1').$$

If we overwrite the mosaic location values of the decoded image R' with the original data values R it should be clear that $(R, I_0', I_1')$ satisfies the second constraint and is closer in satisfying the first than our original guess $(R', I_0', I_1')$. We can repeat and iteratively JPEG encode and decode, followed by overwriting the original mosaic data values to the output of the decoder. This produces an image which always satisfies the second constraint, and whose error with respect to the first decreases with each iteration until we reach a minimum.

Figure 5:
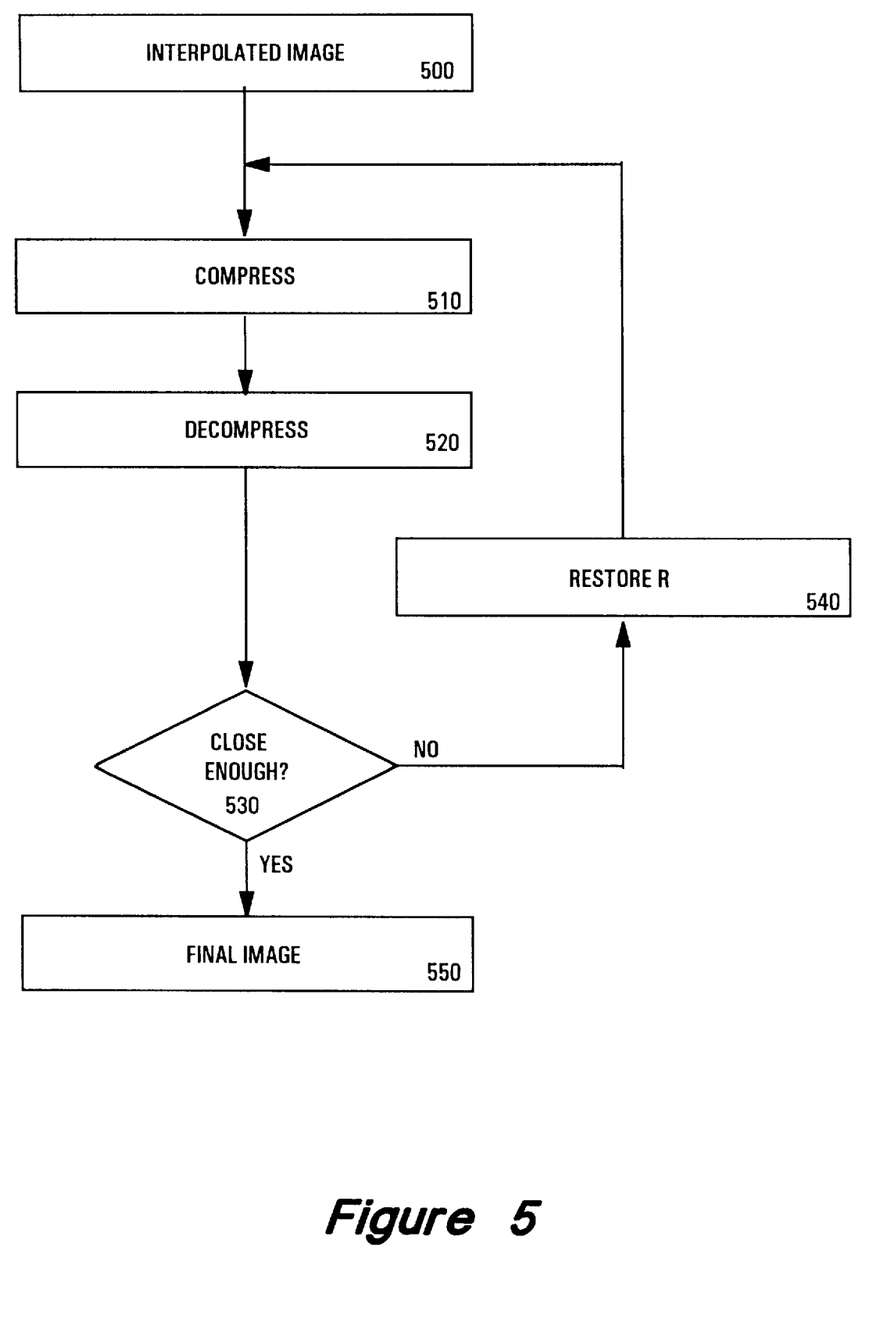
FIG. 5 is a flow chart illustrating a mosaiced image compression process that practices image compression artifact reduction as practiced according to one embodiment of the present invention.

FIG. 5 is a flow chart illustrating a mosaiced image compression process that practices image compression artifact reduction as practiced according to one embodiment of the present invention. In FIG. 5, interpolated image 500 is first compressed (510) and then decompressed (520). A test is then performed (530) to determine whether the image resulting after compression and decompression is close enough to the image before compression. If the error from compression noise is unacceptable, then the raw data is restored to the decompressed image (530) and the resulting image is again compressed (510) and decompressed (520).

This iterative process is repeated until it is determined (530) that compression noise has reduced to an acceptable level or no further improvement is achieved, at which time the final compressed image (550) is output.

Figure 6:
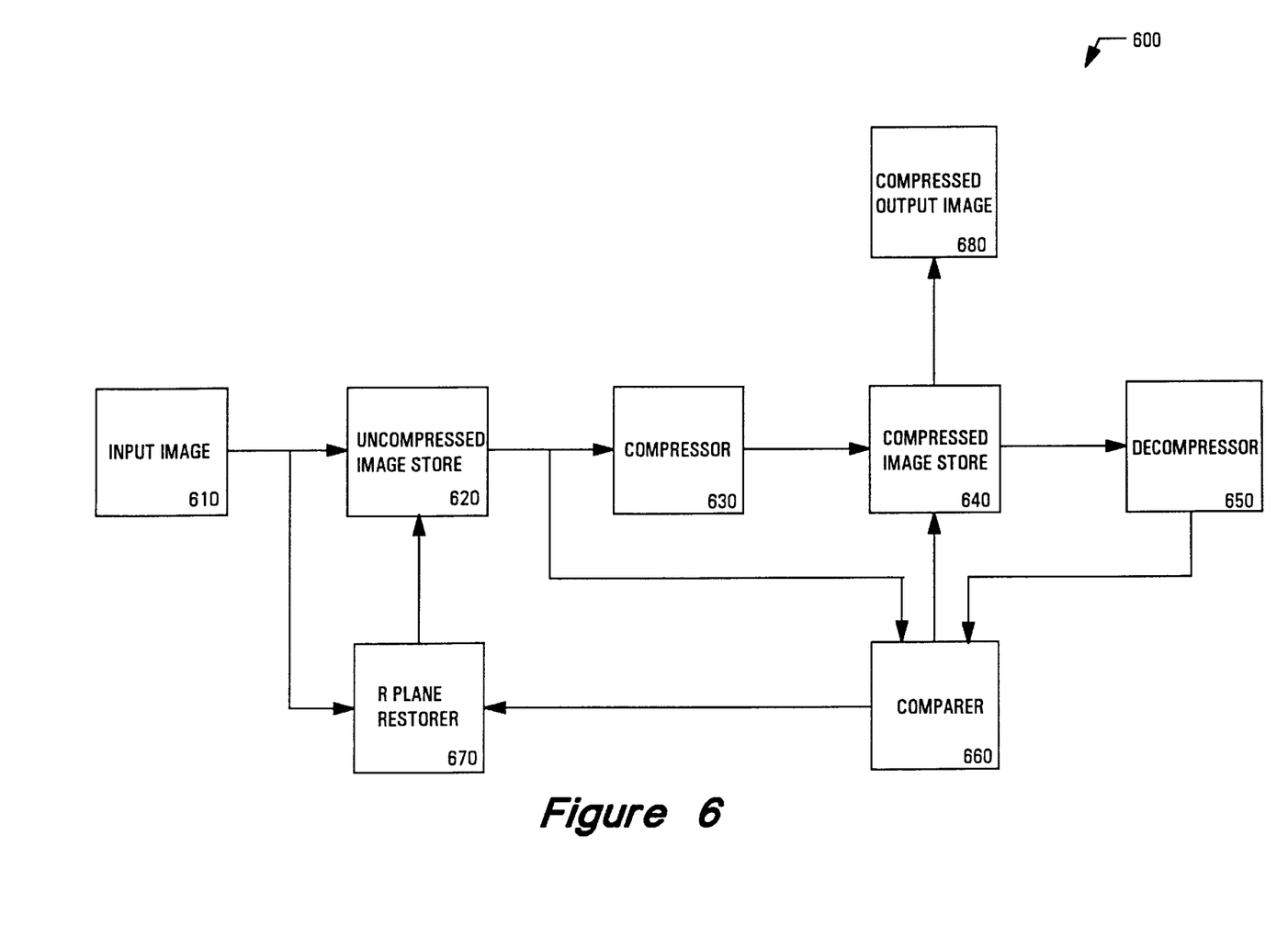
FIG. 6 is a block diagram illustrating a mosaiced image compression apparatus that practices image compression artifact reduction as practiced according to one embodiment of the present invention.

FIG. 6 is a block diagram illustrating a mosaiced image compression apparatus 600 that practices image compression artifact reduction as practiced according to one embodiment of the present invention. Input image 610 is provided to uncompressed image store 620 and then compressed by compressor 630. The compressed image is provided to compressed image store 640 and then decompressed by decompressor 650.

Comparer 660 compares the image stored in uncompressed image store 620 to the compressed and then decompressed image from decompressor 650. If the two images are not close enough to each other, then R plane restorer 670 inserts the raw image data, R, from the input image 610 into the compressed and then decompressed image from decompressor 650. The resulting image is then provided to uncompressed image store 620 to be compressed 630, decompressed 640 and compared 660.

This process iterates until comparer 660 determines that the image stored in uncompressed image store 620 is close enough to the decompressed image from decompressor 650. When the two images are close enough, comparer 660 causes compressed image store 640 to release the compressed image stored therein to be compressed output image 680. Alternately, rather than requiring convergence of the images, the iterations can stop after a certain number of iterations have occurred.

Approach to Help Iteration

The algorithm described above, will find only a local minimum. The set of images that satisfy the second constraint corresponds to a space. However, the set of images that satisfies the first is a grid of isolated points. The finer the quantization steps used the closer the spacing of the grid. If we start from a point that satisfies the second constraint, the above algorithm merely converges to the closest grid point to the starting guess. It is suboptimal in the sense that even if an image that satisfies both constraints existed, this algorithm would not necessarily find it.

We can improve the situation somewhat by an understanding of the quantization process. The grid of JPEG points using one quantization matrix will be a strict subset of the grid using another, provided that the quantizer stepsizes of the first are multiple of the quantizer stepsizes of the second. Thus, for example, the JPEG grid using any quantization matrix is always a strict subset of that found when using the matrix where all stepsizes are set to 1 (the smallest allowed in the standard). If we apply the iterative algorithm with all stepsizes are set to 1 we will converge to a local minimum with respect to the Q-matrix. If we then do one final iteration with the desired Q-factor we end up at the grid point on the larger grid which is closest to the local minimum just found. In experiments we found in this approach to work very well in reducing the residual noise.

Experimental Results

Figure 7:
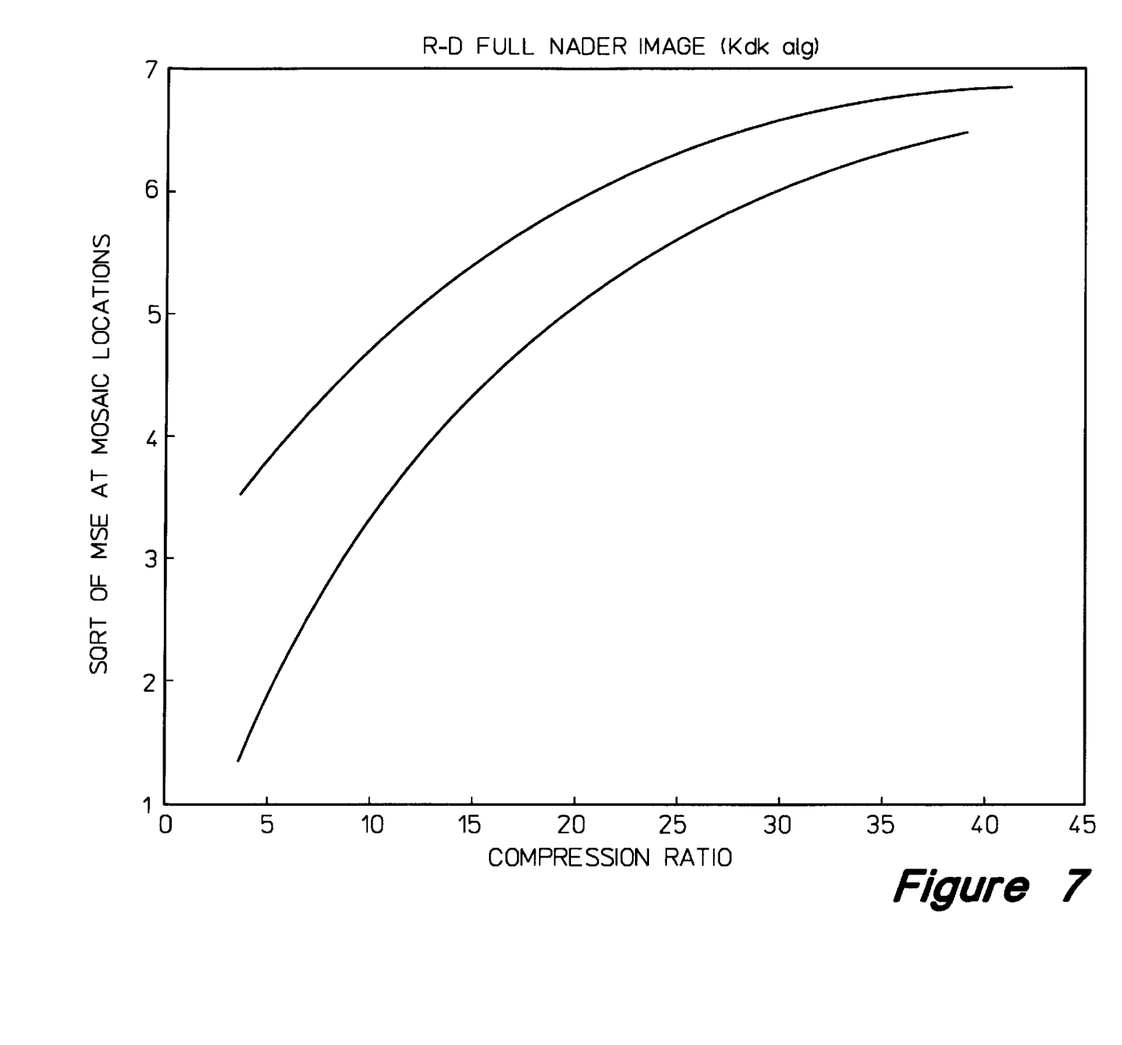
FIG. 7 is a representative comparison of Root Mean Squared Error as a function of compression ratio between a mosaiced image compression scheme that practices image compression artifact reduction as practiced according to one embodiment of the present invention and a traditional mosaiced image compression scheme.

FIG. 7 is a representative comparison of Root Mean Squared Error as a function of compression ratio between a mosaiced image compression scheme that practices image compression artifact reduction as practiced according to one embodiment of the present invention and a traditional mosaiced image compression scheme.

In order to test the efficacy of the algorithm, we carried out the pre-processing procedure on digital camera data taken from a Kodak DCS-200 digital camera. The data was first color interpolated using the algorithm suggested by Kodak in Programmer's reference manual models: DCS200ci, DCS200mi, DCS200c, DCS200m, Eastman Kodak Company, December 1992. This was used as a starting point for the iterative pre-processing algorithm, and the resultant Root Mean Squared Error as a function of compression ratio is shown by the lower line in FIG. 7. For comparison purposes, we plot the RMSE using the Kodak algorithm alone, this is plotted as the upper line in FIG. 7. It can be seen that there is significant decrease in the residual noise at all compression ratios, although it decreases somewhat as the compression ratio becomes large.

A particularly appealing aspect of the algorithm is that, while iterative in nature, a large part of the improvement is realized in the first few iterations, and even a single iteration improves the noise considerably. Because one full encode/decode cycle is used on the first pass in a two pass rate control algorithm, it would be essentially cost-free to incorporate one iteration of the pre-processing algorithm. Such a two pass rate control algorithm is described in U.S. patent application Ser. No. 08/521,789, filed Aug. 31, 1995, G. Yovanof and A. Drukarev, Fixed Rate JPEG Compliant Still Image Compression.

From a qualitative point of view, we have compared details from an images processed by the pre-processing algorithm to those formed using a conventional JPEG pipeline (at the same compression rate). Typically, we have found the pre-processing image to be sharper and to have fewer color aliasing problems that processed traditionally.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A lossy compression process for a mosaiced image having a raw data plane and an interpolated plane, the process comprising the steps of:
   a) compressing the mosaiced image to yield a compressed image;
   b) decompressing the compressed image to yield a decompressed image having a decompressed data plane and a decompressed interpolated plane;
   c) comparing the raw data plane to the decompressed data plane; and
   d) if the decompressed data plane is sufficiently different from the raw data plane, inserting the raw data plane into the decompressed image in place of the decompressed data plane.

2. The process as set forth in 1, comprising the step of performing steps a) and b) on the decompressed image resulting in step d).

3. The process as set forth in claim 2, comprising the step of performing step c) on the decompressed image resulting in step b) after completing steps d), a) and b).

4. The process as set forth in claim 3, comprising the step of stopping after performing step a) a predetermined number of times.

5. The process as set forth in claim 1, wherein the mosaiced image comprises a plurality of the interpolated planes.

6. The process as set forth in claim 1, wherein the decompressed mosaiced image comprises a plurality of the decompressed interpolated planes.

7. A lossy compression processor for a mosaiced image having a raw data plane and an interpolated plane, the processor comprising:
   compressor means for compressing the mosaiced image to yield a compressed image;
   decompression means for decompressing the compressed image to yield a decompressed image having a decompressed data plane and a decompressed interpolated plane;
   comparing means for comparing the raw data plane to the decompressed data plane; and
   restoration means for inserting the raw data plane into the decompressed image in place of the decompressed data plane, if the decompressed data plane is sufficiently different from the raw data plane.

8. The processor as set forth in 7, wherein the decompressed image resulting from the restoration means is compressed by the compressor means to yield a compressed image that is decompressed by the decompression means.

9. The processor as set forth in claim 8, wherein the comparing means compares the raw data plane to the decompressed raw data plane after iteration.

10. The processor as set forth in claim 9, wherein the processor yields the compressed image from the compressor means as a final compressed image after a predetermined number of the iterations.

11. The processor as set forth in claim 7, wherein the mosaiced image comprises a plurality of the interpolated planes.

12. The processor as set forth in claim 7, wherein the decompressed mosaiced image comprises a plurality of the decompressed interpolated planes.

13. A lossy compression processor for a mosaiced image having a raw data plane and an interpolated plane, the processor comprising:
   a compressor to compress the mosaiced image to yield a compressed image;
   a decompressor to decompress the compressed image to yield a decompressed image having a decompressed data plane and a decompressed interpolated plane;
   a comparer to compare the raw data plane to the decompressed data plane; and
   a restorer to insert the raw data plane into the decompressed image in place of the decompressed data plane, if the decompressed data plane is sufficiently different from the raw data plane.

14. The processor as set forth in 13, wherein the decompressed image resulting from the restorer is compressed by the compressor to yield a compressed image that is decompressed by the decompressor.

15. The processor as set forth in claim 14, wherein the comparer compares the raw data plane to the decompressed raw data plane after iteration.

16. The processor as set forth in claim 15, wherein the processor yields the compressed image from the compressor as a final compressed image after a predetermined number of the iterations.

17. The processor as set forth in claim 13, wherein the mosaiced image comprises a plurality of the interpolated planes.

18. The processor as set forth in claim 13, wherein the decompressed mosaiced image comprises a plurality of the decompressed interpolated planes.

* * * * *